(No Model.)
M. PRIDHAM.
PROCESS OF AND APPARATUS FOR PURIFYING, RECTIFYING, AND DEODORIZING ALCOHOLIC OR OTHER LIQUIDS.
No. 574,111. Patented Dec. 29, 1896.
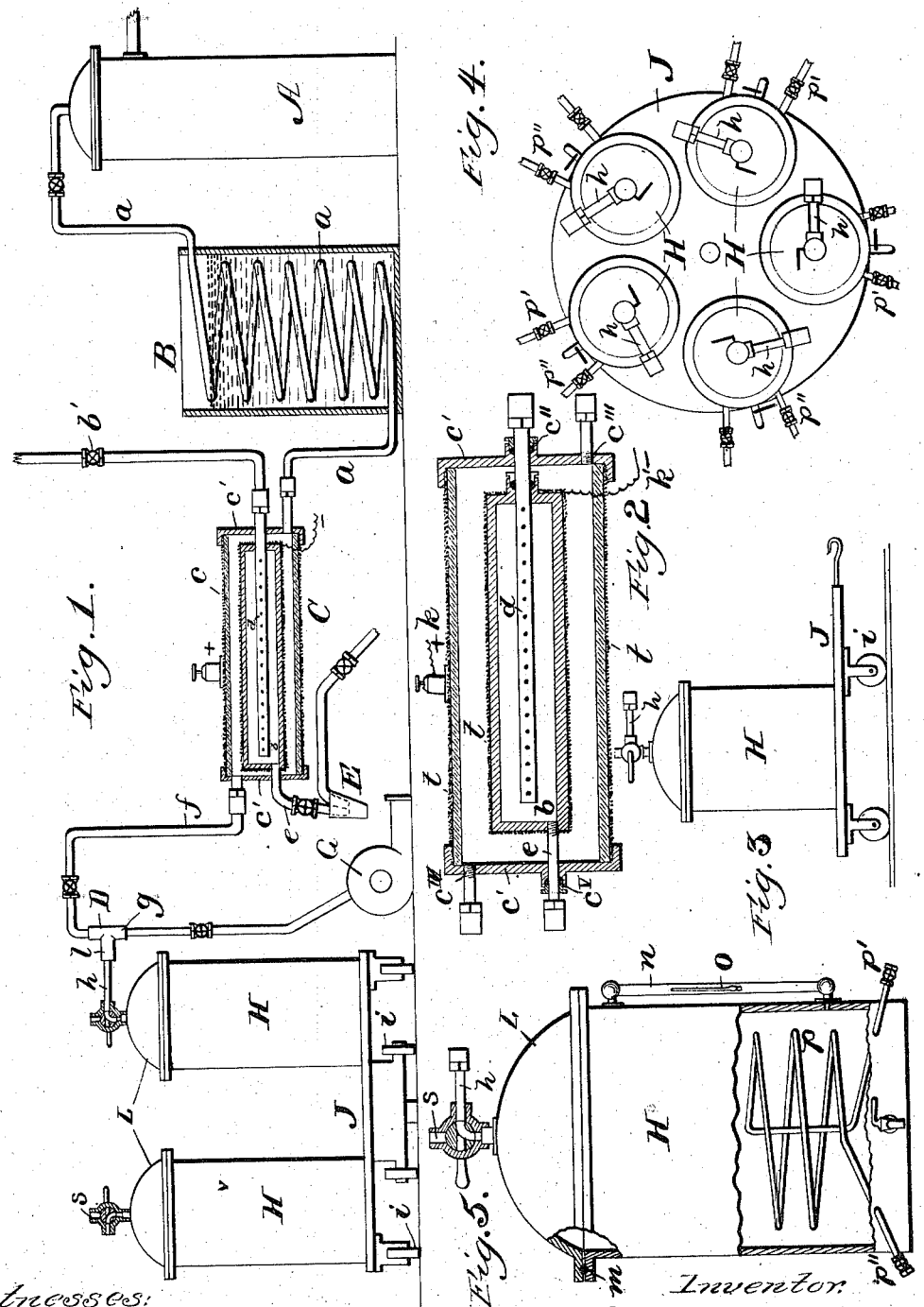
Witnesses:
J. B. McGirr.
J. S. Appleman.
Inventor.
Marshall Pridham,
By Howson & Howson,
his Attys.

UNITED STATES PATENT OFFICE.

MARSHALL PRIDHAM, OF PHILADELPHIA, PENNSYLVANIA, ASSIGNOR, BY DIRECT AND MESNE ASSIGNMENTS, TO THE ELECTRIC RECTIFYING AND REFINING COMPANY, OF CAMDEN, NEW JERSEY.

PROCESS OF AND APPARATUS FOR PURIFYING, RECTIFYING, AND DEODORIZING ALCOHOLIC OR OTHER LIQUIDS.

SPECIFICATION forming part of Letters Patent No. 574,111, dated December 29, 1896.

Application filed September 12, 1896. Serial No. 605,632. (No model.)

*To all whom it may concern:*

Be it known that I, MARSHALL PRIDHAM, a citizen of the United States, residing at Philadelphia, county of Philadelphia, State of Pennsylvania, have invented certain new and useful Improvements in the Process of and Apparatus for Purifying, Rectifying, and Deodorizing Alcoholic or other Liquids, of which the following is a specification.

My invention relates to a new and useful improvement in the process of purifying, aging, and rectifying alcoholic liquids and deodorizing and decolorizing methylated spirits and in a new and useful apparatus for carrying out the said process.

The objects of my invention are to effect the purification, rectification, and aging of ordinary alcoholic liquids, &c., and decolorizing and deodorizing methylated spirits by treating said liquids with ozone in such a way as to effect the desired result in the most efficient and speedy manner as well as in the simplest way, and also to provide a simple and effective apparatus for carrying out the process, in which the parts are arranged with a view of securing the action of the ozone gas upon the liquids in the most direct and effective way, and to provide apparatus for the refrigeration of oxygen preliminary to the generation of ozone therefrom in connection with apparatus for the generation of said ozone of the highest degree of strength for use in the process.

The first part of my invention relates to the process of treating the liquids for aging and rectifying them and deodorizing and decolorizing wood-alcohols; and it consists, essentially, in subjecting the liquids to the action of ozone in suitable vessels in which a vacuum has been formed and in the details of the said process, as hereinafter more particularly described and claimed.

The second part of my invention relates to the apparatus for carrying out the process, consisting of a new and improved vessel, connections, and appurtenances, in which the liquid is to be subjected to the action of ozone gas, the novel features of which are hereinafter particularly described, and pointed out in the claims, with reference to the accompanying drawings.

Before proceeding with the detail description of the apparatus and the process carried out therein I may describe my improved process briefly by saying that I first provide a suitable vessel in which the liquid to be treated is introduced and connect to said vessel an air-exhauster or vacuum-pump for the purpose of exhausting the air therefrom. After the air has been sufficiently exhausted to establish a suitable vacuum the connection with the air-exhauster is closed and the vessel is then put in communication with an ozone-reservoir. The degree of partial vacuum to be maintained in the treating vessel may be varied, the general rule being that the nearer a perfect vacuum is approached the more rapid will be the treatment. A sufficient quantity of the ozone gas is then admitted to the vessel containing the liquid, the said gas permeating the liquid and thoroughly and intimately mixing with every portion of the same, the ozone readily and completely filling the space previously occupied by the air.

The ozone by oxidation converts the more carbonized alcohols and compound ethers into other ethers and acids, and, as illustrating the particular change that takes place in liquids under treatment when subjected in the manner defined to the action of the ozone, I may say, for example, that as fusel-oil found in spirits contains amyl alcohols, ($C_5H_{11}OH$,) propyl alcohols, ($C_3H_7OH$,) butyl alcohols, ($C_4H_9OH$,) and œnanthol aldehyde ($C_7H_{14}OH$) the oxidation by the ozone causes the amyl alcohol to be converted into isovaleric acid, ($C_5H_{10}O_2$,) the butyl alcohol into butyric acid, ($C_4H_8O_2$,) and œnanthol aldehyde into œnanthylic acid, ($C_7H_{14}O_2$,) while some of the essential oils are completely destroyed, and this conversion of the alcohols into the corresponding acids and destruction of the essential oils imparts to the spirits the bouquet and mellowness now acquired by time, while the action upon wood-alcohol effects the complete decolorization and deodorization of the same.

In order to increase the efficiency of the process, I preferably employ suitable means for regulating the temperature of the liquid while undergoing the treatment. In my present apparatus I preferably employ a spiral coil-pipe located within the vessel containing the liquid, through which coil steam, air, or water may be passed for regulating the temperature of the liquid, and while the ozone may be derived from any suitable source I find that the most economically and efficiently obtained ozone for the treatment is that derived by subjecting the oxygen gas to a refrigeration and then passing the cooled gas through an ozone-generator in which fine sprays or streams of a cooling liquid, as water, are caused to cool the gas, thereby decreasing its temperature and simultaneously subjecting the gas to the influence of an induced electrical brush-discharge, thus converting the oxygen into ozone of the greatest degree of strength. The ozone thus generated may be led directly into the vessel containing the liquid under treatment, or, if desired, though not preferred, it may be led to a reservoir kept sufficiently cool by suitable means and thence withdrawn as needed for the treatment.

I will now describe my preferred form of apparatus for carrying out the process, as shown in the accompanying drawings, to which reference is now made, in which—

Figure 1 is a side elevation of the complete apparatus, partly sectional. Fig. 2 is a detail sectional view of the ozone-generator. Fig. 3 is a side elevation of a modified form of movable carrier for the liquid-treating vessels. Fig. 4 is a top plan view of the carrier shown in Fig. 1. Fig. 5 is a detail side view, partly sectional, of my improved liquid-treating vessel.

In the drawings, in which the same reference-characters relate to the same or corresponding parts in all the views, and referring first to Fig. 1, A is a tank or reservoir for the oxygen derived from any suitable source, which tank is connected by a pipe $a$ to the ozone-generator C, and interposed between the ozone-generator and the reservoir A is a refrigerating or cooling tank B, through which tank the pipe $a$ passes on its way to the generator C, a portion of the pipe $a$ being preferably spirally coiled and surrounded by a refrigerating liquid or cooling medium, for example, ammonium nitrate and water, ($NH_4NO_3 + H_2O$.)

Instead of passing the oxygen gas through a cooling medium I may compress the same to, say, one hundred and fifty atmospheres, and by rapid expansion of the compressed gas into either the ozone-generator or supply-chamber for the same, and thereby greatly decrease its temperature, thus refrigerating the said oxygen to a sufficient degree.

The ozone-generator C consists, essentially, of a glass casing $c$, preferably in the form of a tube or pipe about thirty-six inches long and five inches in diameter, closed at each end by suitable caps $c'$, which are provided, respectively, with two apertures $c''$ $c'''$ and $c^{iv}$ $c^{v}$. Within this outer glass casing is another casing or box $b$, preferably of metal and of slightly smaller diameter than the outer casing, which inner casing is centrally supported therein and forming a space between the two, and within the inner casing is a spraying device consisting, in the present instance, of a perforated metal tube $d$, closed at one end and open at the other end, which latter end passes through the perforation $c''$ in the cap $c'$ and is adapted to be connected with a suitable supply of cooling fluid, air, or water, which may be admitted and cut off as desired by means of the valve $b'$. Connected to the inner casing $b$, preferably at one end, is a discharge-pipe $e$, leading to an ejector E, which may be used when desired for the purpose of withdrawing any surplus fluid that may interfere with the spraying of the cooling fluid within said casing $b$, as hereinafter more fully described.

Communicating with the interior of the glass tube $c$ is a pipe $f$, secured in the perforation $c^{iv}$ and leading to a T-coupling D and forming one branch of said coupling, the other branch $g$ being connected to a suitable vacuum or air pump G. This coupling has a main stem $l$, adapted to be connected to the admission-pipes $h$ of the liquid-treating vessels H, and the said coupling is supported by suitable standards or supports a sufficient distance from the floor to permit the stem to be readily connected with the liquid-treating vessels H, that are successively brought into position for the treatment of the liquid. I preferably mount the said vessels upon a movable platform J, having suitable rollers $i$, so that the several tanks, after being supplied with the liquid for treatment, may be readily moved in position for connection with the T-coupling. These movable carriers or platforms may be circular and mounted upon a central axis, (shown in Figs. 1 and 4,) or the platforms may be replaced by trucks or cars running upon tracks, as shown in Fig. 3.

I will now describe the details of construction of the ozone-generator whereby the electrical brush-discharge for acting upon the oxygen to produce ozone is induced. The outer surfaces of the metal casing $b$ and of the glass casing $c$ are coated with a layer $t$ of a suitable material for inducing a brush-discharge, such as powdered carbon, lead-dust, or other equivalent suitable material, to each of which casings are connected the terminals of the secondary coil of a step-up transformer supplied with a suitable current of electricity, preferably an alternating current. The negative terminal $k'$ is connected to the outer surface of the inner casing, and the positive terminal $k$ is connected to the outer surface of the glass casing. When the current is turned on a brush-discharge is induced between the inner walls of the glass casing and the outer walls of the inner casing. The oxygen gas enters the glass casing through the pipe $a$, passing through the annular space surrounding the inner casing, in which it is subjected to the action of the brush-discharge, during which action cold water or other suitable cooling fluid is caused to enter the perforated pipe or tube $d$, and being under pressure the said air or water is forced through the perforations in the tube $d$ in fine streams, which strike the inner side of the metal casing, and any surplus fluid that might interfere with the spraying of the same may be withdrawn from the inner casing by means of the ejector E.

By refrigerating the oxygen, as hereinbefore described, and by subjecting the same to the cooling action of the sprays of water or cold air in the cylindrical box, the walls of which separate the water or air from direct contact with the oxygen, I find that substantially pure ozone of a very high degree of strength can be economically and rapidly produced, and for this reason I prefer the particular construction of generator described.

By the terms "substantially pure ozone," as herein used and in the claims, I mean ozone gas when produced from oxygen, having no contamination other than oxygen, and when produced from air having no contamination other than oxygen and a trace of nitrogen.

The tank for holding the liquid to be treated is preferably of the special construction shown in the drawings, in which the said tank is preferably a glazed-metal cylinder H, of a capacity of about one hundred gallons, more or less, as the circumstances may require, to the body of which tank is secured a suitable top or cover L, provided with a two-way valved inlet $h$, adapted to be connected with the vacuum or air-exhauster and gas-supply through the stem $l$, and through which inlet the liquid to be treated may be introduced by way of the passage $s$. This cover is secured to the body of the tank with an air-tight joint formed by projecting flanges, between which are interposed a lead gasket $m$ or other suitable packing material seated in grooves formed in the flanges, which flanges are secured together by suitable bolts.

A glass gage $n$ is connected to the sides of the vessel communicating with the interior at the top and bottom for the purpose of indicating the level of the liquid in the tank, and in this glass gage is placed a thermometer $o$, so that the temperature of the liquid can be noted and regulated in the manner hereinafter described.

Within the tank, preferably at the bottom, is a coil-pipe $p$, arranged to be covered by the liquid and having a valved inlet $p'$ and a valved outlet $p''$, the said inlet being adapted to be connected with a suitable source of a refrigerating or heating medium, such as water, steam, or air, whereby any one of these fluids may be passed through the coil-pipe in order to cool or heat the liquid in the tank, according as it is desired to lower or raise the temperature thereof, and by which means the temperature of the liquid may be maintained at any desired point, preferably at low temperature.

From this description the mode of operating the apparatus and the manner of carrying out my process may be readily understood, and may now be briefly summarized.

After the tank is filled with the liquid it is brought into position by means of the movable platform or the trucks and connected with the main stem $l$ of the T-coupling and there locked in position by suitable chocks or otherwise in order to prevent the movement of the platform while the liquid is being treated, thereby avoiding injury to the connections. The gas-valve being closed, connection with the air-pump is opened and the air is then exhausted by means of the pump G or other suitable air-exhausting apparatus, the temperature of the liquid being noted by the thermometer in the glass gage and the cooling or heating fluid being circulated through the coil-pipe $p$ of the tank in order to regulate the temperature of the liquid contained therein, as desired. In this connection I may state that the colder the liquid to be treated the easier the vacuum is formed and the greater the action of the gas in the conversion of the ethers, acids, and aldehydes into other ethers and acids and the greater the destruction of the essential oils. After the air has been exhausted to the desired degree the air-pump is stopped, its connections closed, and the ozone-gas connection is opened, admitting ozone to the tank, the said ozone having been generated preferably in the manner hereinbefore described, and when the liquid has become sufficiently charged with the gas the valves of all connections are then closed and the tank disconnected from the charging apparatus, the platform shifted, and another tank filled with liquid and moved into position for treatment.

By the use of the term "rectifying" in the claims I intend to include also that action which causes the deodorization and decolorization of methylated alcohols.

I do not in this application claim the process of and apparatus for generating ozone gas, as such improvements form the subject-matter of a separate application filed by me on October 15, 1896, Serial No. 608,987, which application constitutes a division of the present application, although I have fully shown and described such subject-matter in this application, for the reason that said improvements constitute the preferred means of producing ozone gas for use in the present process. It it obvious, however, that ozone gas derived in any other suitable manner may be used in connection with the process herein claimed.

I claim as my invention—

1. As an improvement in the art of aging and rectifying alcoholic liquids, &c., the herein-described process consisting in first removing the air from said liquids, contained in suitable vessels, and then intimately mixing substantially pure ozone gas with said liquids, substantially as specified.

2. As an improvement in the art of aging and rectifying alcoholic liquids &c., the herein-described process consisting in placing the liquids in a suitable vessel and exhausting the air therefrom, generating substantially pure ozone gas by the action of an electric brush-discharge, and then introducing into said liquid substantially pure ozone gas thus generated, substantially as specified.

3. As an improvement in apparatus for aging and rectifying alcoholic liquids, the combination with a vessel for holding the liquid, provided with a gage for indicating the liquid-level in the vessel and a thermometer in said gage for indicating the temperature of the liquid, of a fluid-conveyer located in the said vessel and arranged to be covered by the liquid, a discharge leading from said fluid-conveyer, and an inlet thereto adapted to be connected to a supply-pipe of a heating or cooling medium, an inlet-pipe for the liquid provided with a valve, and adapted to be connected to an ozone-supply pipe and the suction-pipe of a vacuum apparatus, substantially as described.

4. As an improvement in apparatus for aging and rectifying alcoholic liquids, the combination of a suitable vessel for holding the liquid provided with a suitable inlet and mounted upon a movable platform or truck, of an ozone-supply pipe, leading from a source of ozone, and an air-exhaust pipe leading from an air-exhausting device, the said pipes being supported in position to be connected with the inlet of the vessel, said pipes adapted to be alternately connecting the vessel with the air-exhaust pipe and the ozone-supply pipe, substantially as and for the purposes specified.

In testimony whereof I have signed my name to this specification in the presence of two subscribing witnesses.

MARSHALL PRIDHAM.

Witnesses:
S. A. TERRY,
M. H. MILES.